US008605006B2

(12) United States Patent
Nurmi

(10) Patent No.: US 8,605,006 B2
(45) Date of Patent: Dec. 10, 2013

(54) METHOD AND APPARATUS FOR DETERMINING INFORMATION FOR DISPLAY

(75) Inventor: Mikko Antero Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 946 days.

(21) Appl. No.: 12/646,375

(22) Filed: Dec. 23, 2009

(65) Prior Publication Data

US 2011/0148739 A1 Jun. 23, 2011

(51) Int. Cl.
*G06F 1/16* (2006.01)
(52) U.S. Cl.
USPC .......................................................... 345/1.1
(58) Field of Classification Search
None
See application file for complete search history.

(56) References Cited

U.S. PATENT DOCUMENTS

| 5,500,765 | A | 3/1996 | Eichenlaub | |
|---|---|---|---|---|
| 6,822,662 | B1 | 11/2004 | Cook | |
| 7,460,893 | B2 | 12/2008 | Aarras | |
| 2005/0099361 | A1* | 5/2005 | Majer | 345/1.3 |
| 2007/0120762 | A1* | 5/2007 | O'Gorman | 345/1.1 |
| 2007/0268264 | A1 | 11/2007 | Aarras et al. | |
| 2009/0244064 | A1* | 10/2009 | Inokuchi et al. | 345/420 |
| 2010/0073334 | A1* | 3/2010 | Cohen et al. | 345/204 |
| 2010/0085274 | A1* | 4/2010 | Kilpatrick et al. | 345/1.3 |
| 2010/0245209 | A1* | 9/2010 | Miller et al. | 345/1.3 |
| 2010/0321275 | A1* | 12/2010 | Hinckley et al. | 345/1.3 |
| 2011/0216045 | A1* | 9/2011 | Tsuchida | 345/204 |

FOREIGN PATENT DOCUMENTS

| EP | 1403759 A2 | 3/2004 |
|---|---|---|
| EP | 1425718 A2 | 6/2004 |
| JP | 2001195609 A2 | 7/2001 |
| JP | 2003223095 A | 8/2003 |
| JP | 2006133454 A | 5/2006 |
| WO | 03021394 A2 | 3/2003 |
| WO | 2004004362 A1 | 1/2004 |
| WO | 2009157382 A1 | 12/2009 |

OTHER PUBLICATIONS

International Search Report and Written Opinion, received in corresponding Patent Cooperation Treaty Application No. PCT/IB2010/055998. Dated Apr. 18, 2011. 14 pages.

* cited by examiner

*Primary Examiner* — Joseph Haley
*Assistant Examiner* — Emily Frank
(74) *Attorney, Agent, or Firm* — McClure and Associates, PLLC

(57) ABSTRACT

An apparatus, comprising a processor and memory including computer program code, the memory and the computer program code configured to, working with the processor, cause the apparatus to perform at least the following, determining a first angle between a first display and a second display that is simultaneously viewable with the first display, causing display of a first information on the first display, determining a second information based, at least in part, on first information and on the first angle, and causing display of the second information on the second display is disclosed.

19 Claims, 12 Drawing Sheets

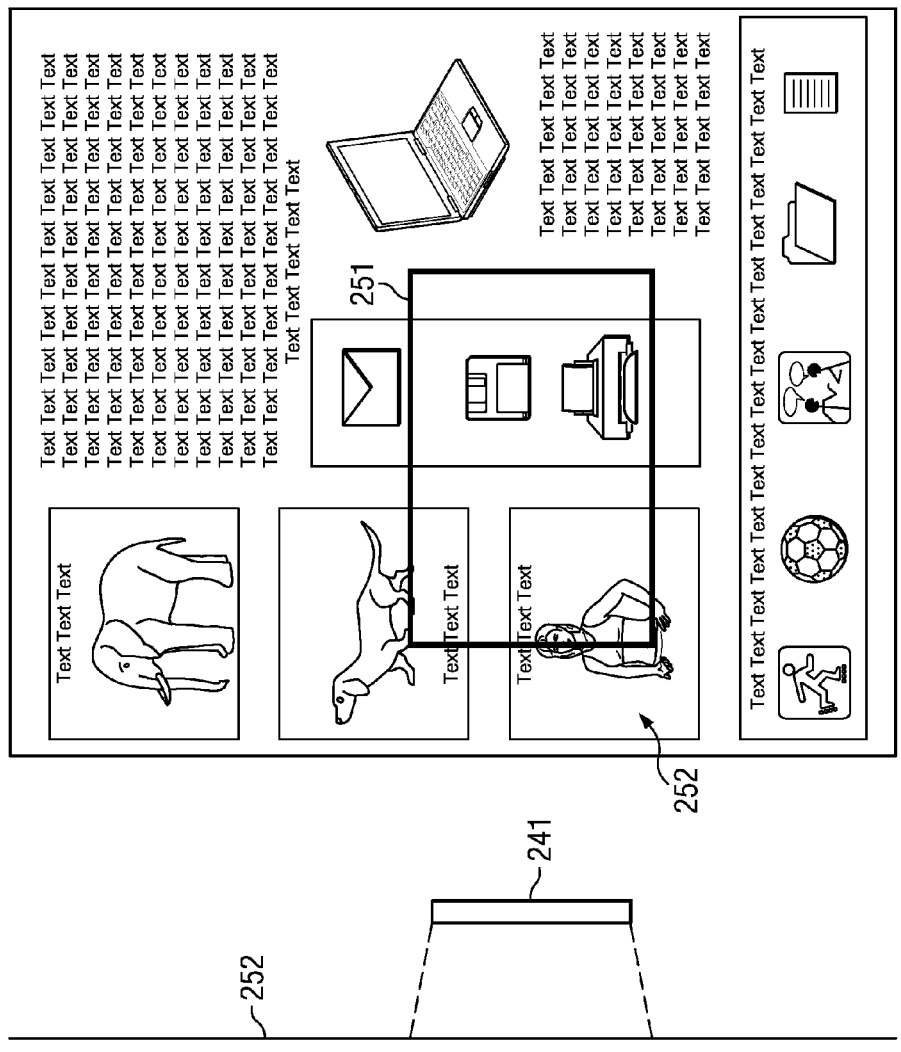
FIG. 2E
FIG. 2F
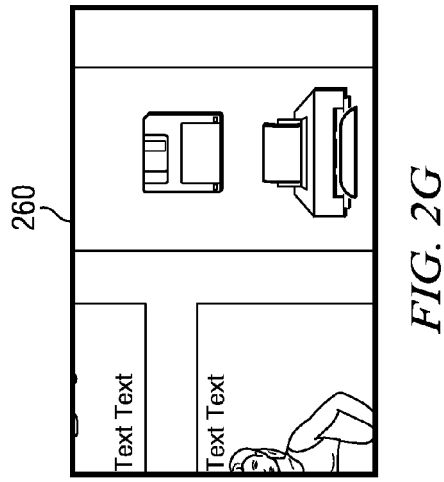
FIG. 2G

METHOD AND APPARATUS FOR DETERMINING INFORMATION FOR DISPLAY

TECHNICAL FIELD

The present application relates generally to determining information for display.

BACKGROUND

There has been a recent surge in the use of electronic devices having more than one display. Some of these devices allow a user to select multiple representations of information using the multiple displays.

SUMMARY

Various aspects of examples of the invention are set out in the claims.

An apparatus, comprising a processor, memory including computer program code, the memory and the computer program code configured to, working with the processor, cause the apparatus to perform at least the following, determining a first angle between a first display and a second display that is simultaneously viewable with the first display, causing display of a first information on the first display, determining a second information based, at least in part, on first information and on the first angle, and causing display of the second information on the second display is disclosed.

A method, comprising, determining a first angle between a first display and a second display that is simultaneously viewable with the first display, causing display of a first information on the first display, determining, with a processor, a second information based, at least in part, on first information and on the first angle, and causing display of the second information on the second display is disclosed.

A computer-readable medium encoded with instructions that, when executed by a computer, perform, determining a first angle between a first display and a second display that is simultaneously viewable with the first display, causing display of a first information on the first display, determining a second information based, at least in part, on first information and on the first angle, and causing display of the second information on the second display is disclosed.

BRIEF DESCRIPTION OF THE DRAWINGS

For a more complete understanding of embodiments of the invention, reference is now made to the following descriptions taken in connection with the accompanying drawings in which:

FIGS. 2A-2J are diagrams illustrating information for display based, at least in part, on an angle according to an example embodiment;

DETAILED DESCRIPTION OF THE DRAWINGS

Embodiments of the invention and at least some of its potential advantages are understood by referring to FIGS. 1 through 7 of the drawings.

In an example embodiment, a user may view information on two or more displays. The information viewed on the plurality of displays may be interrelated. For example, the information on the plurality of displays may relate to information on a common virtual screen, such as virtual screen 642 of FIG. 6C. In another example, the information of one display may relate to a part, an element, an information item, and/or the like, associated with the information of another display. In such an example, a user may view an image of a building on a display, and view map information indicating the location of the building on a different display.

In an example embodiment, a user may vary the information viewed on a display by changing the angle between one or more displays. For example, the user may modify the viewing angle associated with an image by changing the angle between displays. In another example, the user may change the type of information, such as map information, image information, text information, and/or the like by changing the angle between displays.

Figure 7:
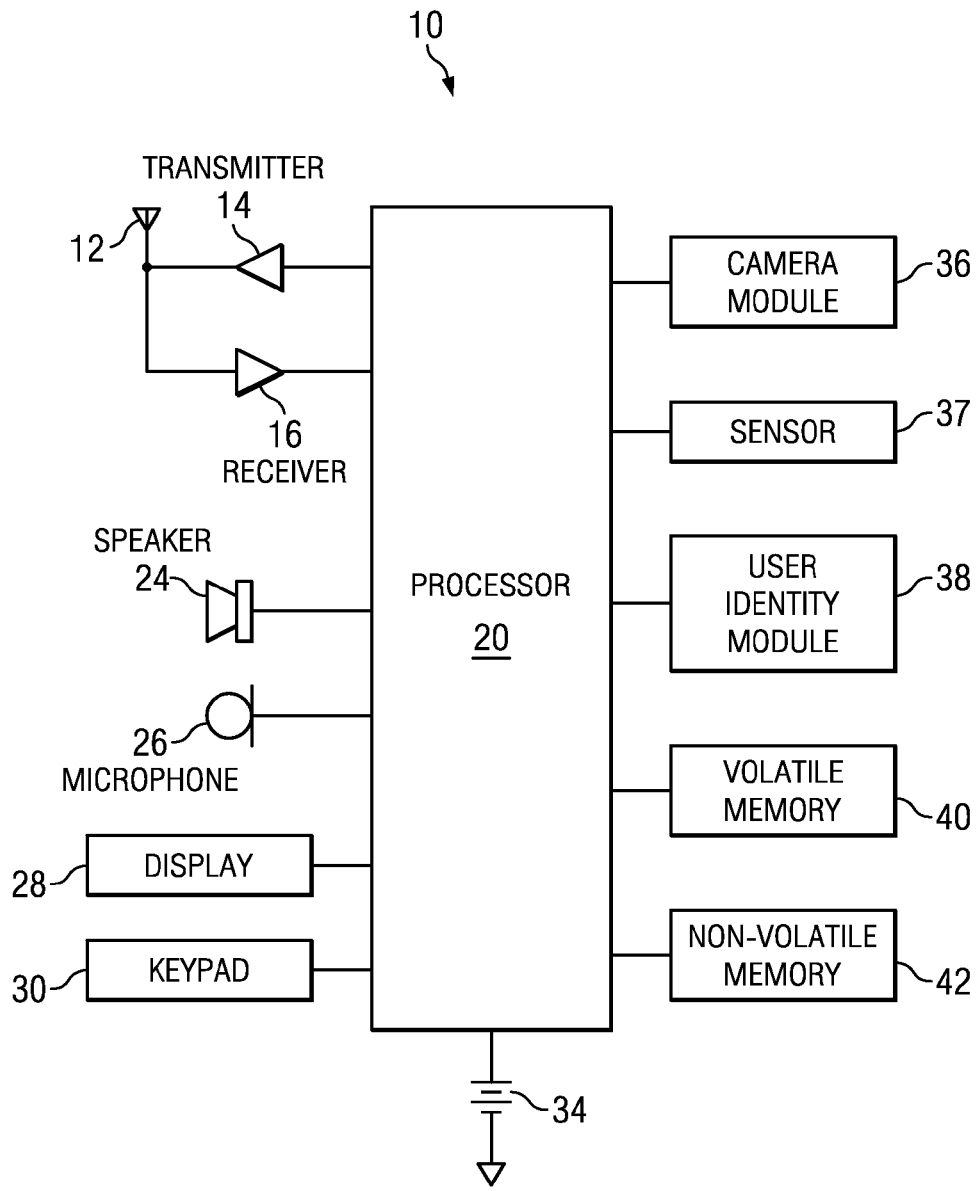
FIG. 7 is a block diagram showing an apparatus, such as an electronic device 10, according to an example embodiment.

In an example embodiment, the angle between displays may be determined using at least one sensor, such as sensor 37 of FIG. 7. For example, the sensor may relate to a foldable attachment between at least two displays. In another example, the sensor may relate to motion sensors associated with multiple displays. In another example, the sensor may relate to one or more acceleration sensor which may detect movement associated with at least one display. Without limiting the scope of the claims in any way, one or more technical advantages associated with determining angle between two or more displays using at least one sensor may be increasing the speed of determining the angle and reducing the amount of user input associated with determining the angle.

The precision to which an angle is determined may vary according to factors such as sensors used, input provided, efficiency of calculation, and/or the like. For example, an apparatus may determine angle to a high level of precision so that it may modify display information according to minor changes in angle. In another example, an apparatus may determine angle to a low level of precision so that a less expensive sensor may be used, fewer calculations may be performed in response to an angle change, fewer calculations may be performed to determine an angle, and/or the like. In addition, precision of angle determination may vary across different circumstances on a single apparatus. For example, a first computer program operating on the apparatus may utilize angle information having a first level of precision, and a second computer program operating on the apparatus may utilize angle information having a second level of precision that differs from the first level of precision. In such an example, the apparatus may determine angle with a higher precision when displaying a computer generated image than when displaying a photographed image. In such an example, the apparatus may have insufficient resources to modify a photographed image within its operating constraints, such as power consumption, execution speed, memory usage, and/or the like. Therefore, when determined angles are represented in this document, they should not be interpreted as exact values, but as substantially similar to any stated value within the precision appropriate for the circumstances. As such, angle values are discussed in terms of being substantially a value, for example, substantially 180 degrees, substantially 90 degrees, substantially less than 180 degrees, substantially greater than 180 degrees, substantially 45 degrees, and/or the like, to allow for precision variation.

FIGS. 1A-1D are diagrams illustrating a plurality of displays, such as display 28 of FIG. 7, according to an example embodiment. The examples of FIGS. 1A-1D are merely examples of possible displays, and do not limit the scope of the claims. For example, there may be more than two displays. In another example, the displays may be comprised in a common apparatus, in multiple apparatuses, such as monitors, and/or the like. In yet another example, the displays may differ in shape, display technology, touch sensor technology, and/or the like. In the examples of FIGS. 1A-1D, the displays are simultaneously viewable in that a user may adequately view information on both displays simultaneously.

Figure 1A:
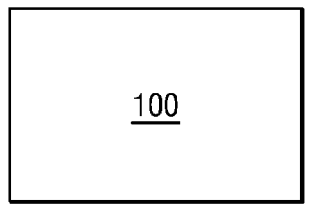
FIGS. 1A-1D are diagrams illustrating a plurality of displays according to an example embodiment.
Figure 1A:
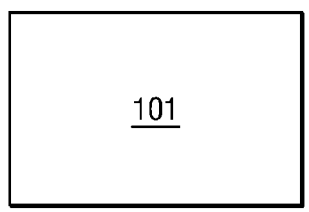

FIG. 1A is a diagram illustrating an example of two displays according to an example embodiment. In the example of FIG. 1A, display 100 and display 101 are simultaneously viewable and facing a substantially common angle. Therefore, the angle between display 100 and display 101 is substantially 180 degrees.

Figure 1B:
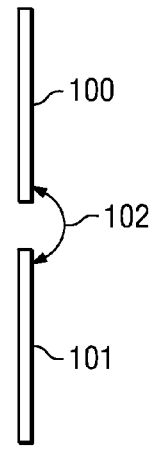

FIG. 1B is a diagram illustrating the displays of FIG. 1A from a different view. In the example of FIG. 1B, angle 102 relates to the angle between display 100 and display 101. In the example of FIG. 1B, angle 102 is as described with reference to FIG. 1A.

Figure 1C:
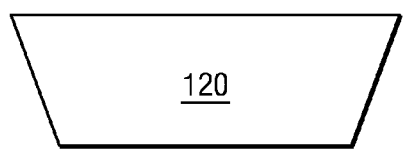
Figure 1C:
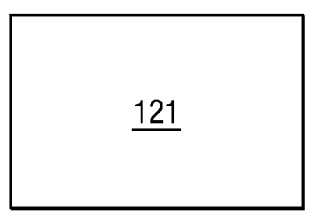

FIG. 1C is a diagram illustrating another example of two displays according to an example embodiment. In the example of FIG. 1C, display 120 and display 121 are simultaneously viewable and facing a substantially different angle in that the level of precision of the apparatus supports determination that the angle is substantially less than 180 degrees. Depending upon the level of precision with which an apparatus determines the angle, the apparatus may determine the angle between display 120 and display 121 is substantially 45 degrees.

Figure 1D:
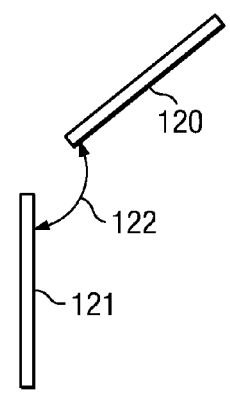

FIG. 1D is a diagram illustrating the displays of FIG. 1C from a different view. In the example of FIG. 1D, angle 122 relates to the angle between display 120 and display 121. In the example of FIG. 1D, angle 122 is as described with reference to FIG. 1C.

FIGS. 2A-2J are diagrams illustrating information for display based, at least in part, on an angle according to an example embodiment. The examples of FIGS. 2A-2J are merely examples of possible information for display, and do not limit the scope of the claims.

The examples of FIGS. 2A-2J relate to an apparatus causing display of a representation of information related to a represented angle that is proportional to a determined angle, such as angle 102 of FIG. 1B. Even though the represented angle is proportional to the determined angle, the represented angle may differ from the determined angle. For example, the represented angle may be the result of applying a calculation to the determined angle. Such calculation may comprise applying an offset, such as subtracting 180 degrees, adding 90 degrees, and/or the like. Such calculation may comprise applying a multiplier, such as 2, 0.5, and/or the like. Such calculation may comprise applying at least one threshold. For example, the apparatus may apply a threshold such that a determined angle substantially greater than 135 degrees will yield a represented angle substantially equal to 135 degrees. In another example, the apparatus may apply a threshold such that a determined angle substantially less than 45 degrees relates to a represented angle substantially equal to 45 degrees.

The examples of FIGS. 2A-2D relate to information related to a perspective view. The information may relate to information from an image, a video, a model, a simulation, and/or the like. A perspective view may relate to a representation of information as it may be seen from an observation point at an angle. The perspective view may relate, for example, to an image, video, photograph, and/or the like, of a real-world object, such as a building, person, landmark, object, vehicle, apparatus, and/or the like, a modeled object, such as a rendered building, character, person, landmark, vehicle, apparatus, and/or the like. An observation point may relate to a location associated with map information, a position in relation to an object, zooming information, panning information, and/or the like. Zooming information may differ between displays. The term observation point is not limited by actual observation. For example, the observation point may relate to a directive associated with modifying an image to provide the appearance of a view of the image from the observation point.

A perspective view may be generated by performing a graphical operation on an existing image, video, and/or the like. In addition, a perspective view may be generated by modeling an object, environment, and/or the like.

Figure 2B:
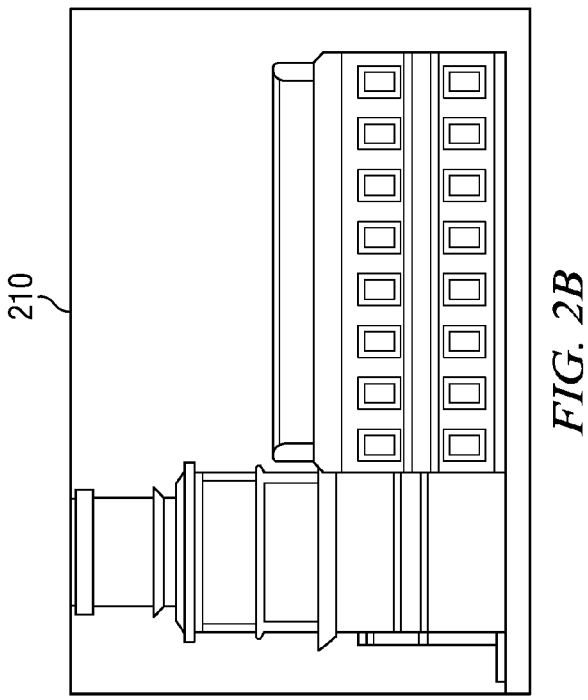
Figure 2A:
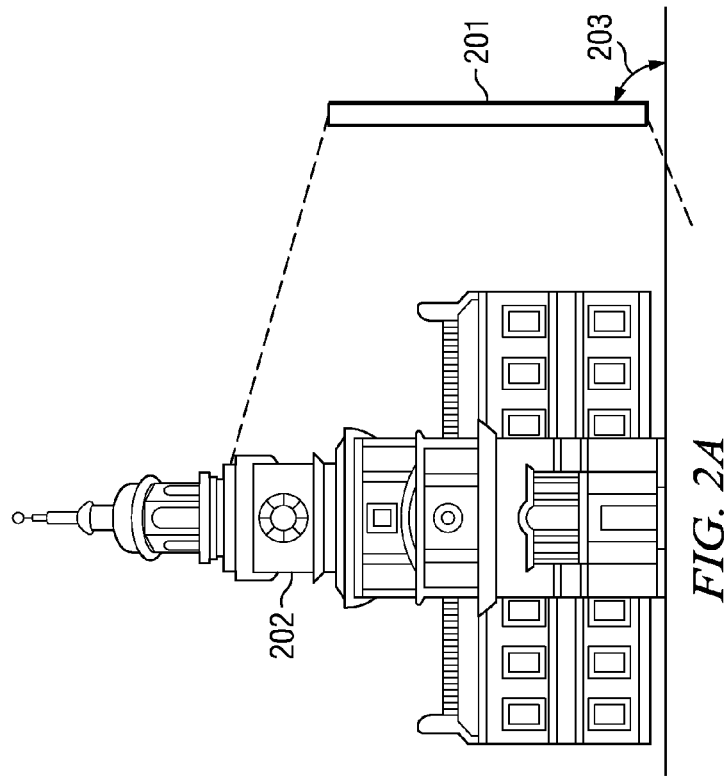

FIG. 2A is a diagram illustrating an example of information and a related represented angle according to an example embodiment. The example of FIG. 2A relates to a perspective view of building 202 associated with observation point 201 and represented angle 203. Broken lines extending from observation point 201 indicate boundaries associated with the perspective view.

FIG. 2B is a diagram illustrating an example of a perspective view 210 associated with the example of FIG. 2A according to an example embodiment. It can be seen in perspective view 210 that the boundaries of the perspective view correspond to the broken lines indicated in FIG. 2A.

Figure 2D:
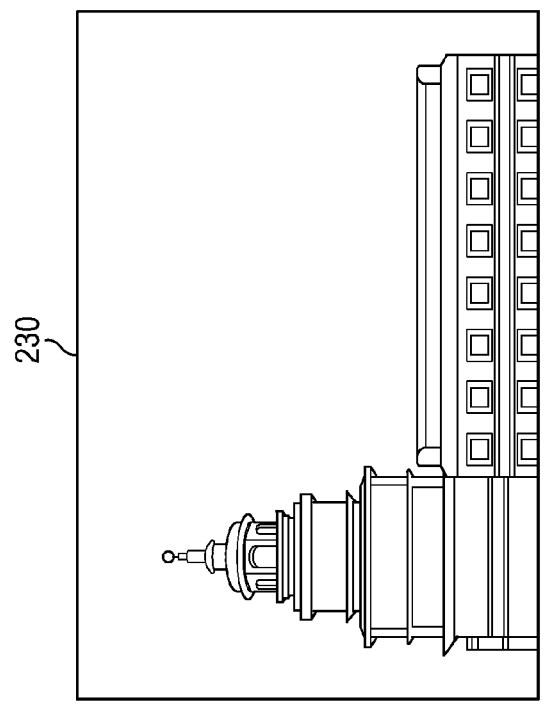
Figure 2C:
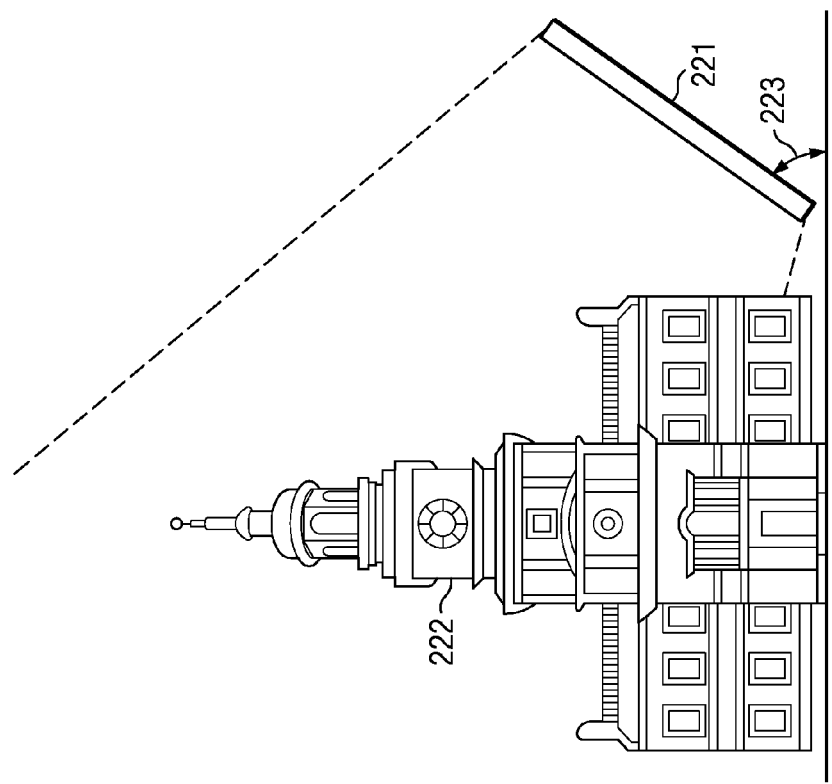

FIG. 2C is a diagram illustrating an example of another information and another related represented angle according to an example embodiment. In the example of FIG. 2C, the diagram relates to a perspective view of building 222 associated with observation point 221 and represented angle 223. Broken lines extending from observation point 221 indicate boundaries associated with the perspective view.

FIG. 2D is a diagram illustrating an example of a perspective view 230 associated with the example of FIG. 2C according to an example embodiment. It can be seen in perspective view 230 that the boundaries of the perspective view correspond to the broken lines indicated in FIG. 2C.

FIG. 2E is a diagram illustrating an example of information associated with virtual screen 252 and a represented angle relating to an angle associated with observation point 241 that is substantially aligned with virtual screen 252. Broken lines extending from observation point 241 indicate boundaries associated with a representation of part of virtual screen 252. Although the example of FIG. 2E indicates a two dimensional virtual screen, virtual screen information may be three-dimensional. For example, an information item associated with a virtual screen may have depth.

FIG. 2F is a diagram illustrating an example of a boundary 251 associated with the information of virtual screen 252 and the related represented angle of FIG. 2E according to an example embodiment. It can be seen that boundary 251 corresponds to the broken lines indicated in FIG. 2E.

FIG. 2G is a diagram illustrating an example of information 260 associated with a representation of a part of the virtual screen 252 of FIG. 2F in relation to boundary 251 of FIG. 2F according to an example embodiment. It can be seen that the boundary of information 260 corresponds to boundary 251 of FIG. 2F.

Figure 2J:
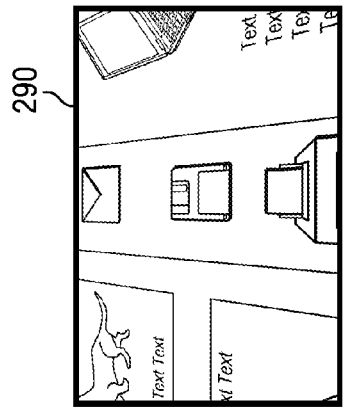
Figure 2I:
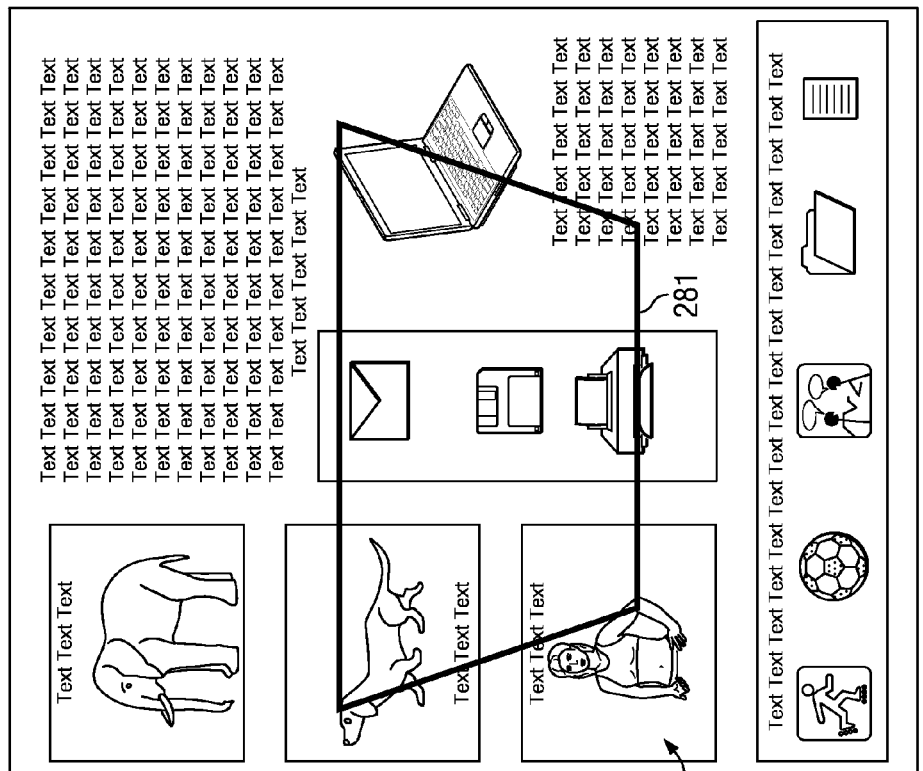
Figure 2H:
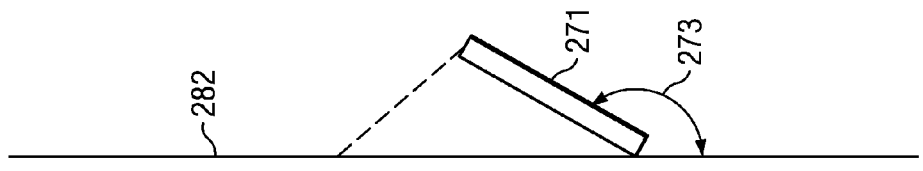

FIG. 2H is a diagram illustrating an example of information associated with an angled representation of virtual screen 282 and represented angle 273 relating to observation point 271. Broken lines extending from observation point 271 indicate boundaries associated with a representation of part of virtual screen 282. Although the example of FIG. 2E indicates a two dimensional virtual screen, virtual screen information may be three-dimensional. For example, an information item associated with a virtual screen may have depth.

FIG. 2I is a diagram illustrating an example of a boundary 281 associated with the information of virtual screen 282 and represented angle 273 of FIG. 2H according to an example embodiment. It can be seen that boundary 281 corresponds to the broken lines indicated in FIG. 2H in that the upper part of boundary 281 is wider than the lower part of boundary 281 in proportion to represented angle 273 of FIG. 2H.

FIG. 2J is a diagram illustrating an example of information 290 associated with an angled representation of a part of the virtual screen 282 of FIG. 2I in relation to boundary 281 of FIG. 2I according to an example embodiment. It can be seen that the boundary of the information 290 corresponds to boundary 281 of FIG. 2I.

Figure 3C:
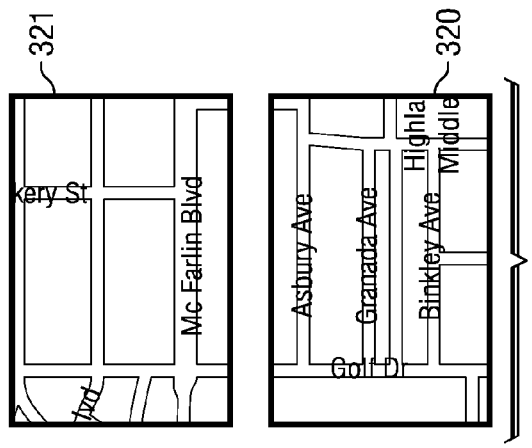
FIGS. 3A-3L are diagrams illustrating information for display on a plurality of displays according to an example embodiment.
Figure 3B:
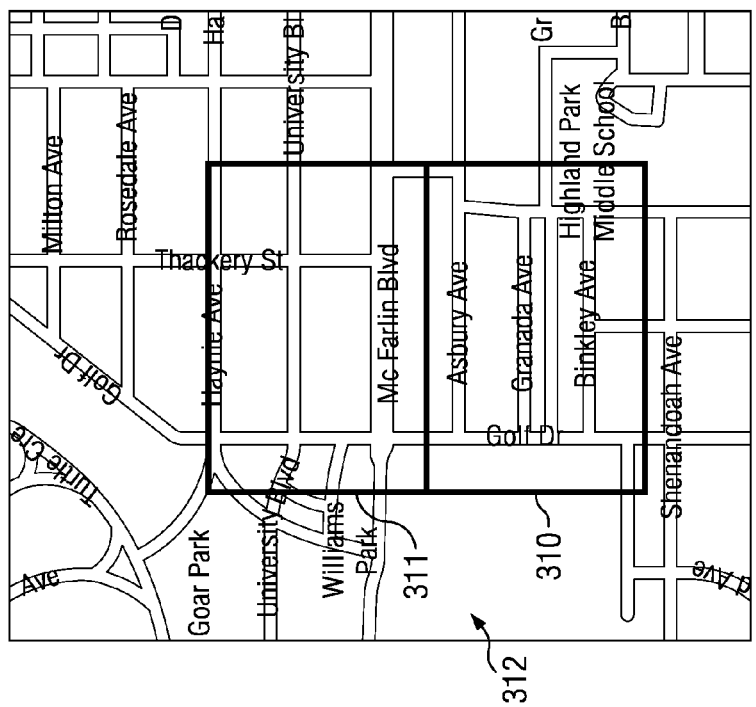
Figure 3A:
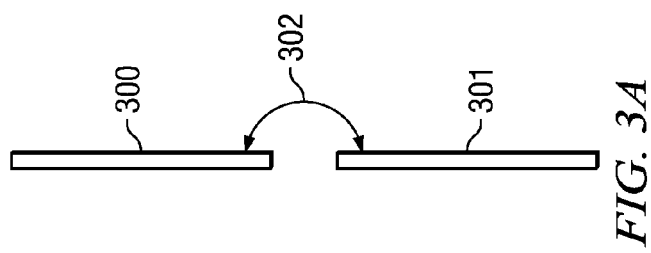

FIGS. 3A-3L are diagrams illustrating information for display on a plurality of displays according to an example embodiment. The examples of FIGS. 3A-3O are merely examples of possible information for display, and do not limit the scope of the claims.

FIG. 3A is a diagram illustrating an example of an angle between displays according to an example embodiment. In the example of FIG. 3A, angle 302 relates to the angle between display 300 and display 301. In the example of FIG. 3A, display 300 and display 301 are simultaneously viewable and facing a substantially common direction. Therefore, the angle 302 is substantially 180 degrees.

FIG. 3B is a diagram illustrating an example of information for display according to an example embodiment. In the example of FIG. 3B, boundary 310 and boundary 311 relate to regions of a common virtual screen 312 comprising map information. The position of boundary 310 may be determined in relation to input, one or more settings, received information, and/or the like. For example, a user may provide input, such as a panning related input, to set, modify, reset, and/or the like, the position of boundary 310. The position of boundary 311 may be based, at least in part, on position of boundary 310. In an example embodiment, position of boundary 311 may be based, at least in part on relative position of display 300 and display 301. For example, boundary 311 may be positioned so that the lower part of boundary 311 coincides with the upper part of boundary 310. Without limiting the scope of the claims in any way, a technical advantage of the lower part of boundary 311 coincides with the upper part of boundary 310 may be to reduce user input associated with repositioning boundary 310 to view an undisplayed region of information associated with a distance between the boundaries. Boundary 311 is based, at least in part, on a represented angle that is proportional to angle 302 of FIG. 3A, similar as described with reference to FIGS. 2E-2F. In the example of FIG. 3B, boundary 310 and boundary 311 are substantially similar based, at least in part, on angle 302 being substantially 180 degrees.

FIG. 3C is a diagram illustrating an example of a first information 320 and a second information 321, in relation respectively to boundaries 310 and 311 of FIG. 3B, associated with a representation of a part of the virtual screen 312 of FIG. 3B according to an example embodiment. First information 320 may be caused to be displayed on display 301 of FIG. 3A. Second information 321 may be caused to be displayed on display 300 of FIG. 3A. It can be seen that the boundary of the information 320 corresponds to boundary 310 of FIG. 3B and that boundary of the information 321 corresponds to boundary 311 of FIG. 3B. Even though not shown in the example of FIG. 3C, first information 320 and/or second information 321 may comprise additional information related to operating information, program information, time information, signal strength information, augmented reality information, and/or the like.

Figure 3F:
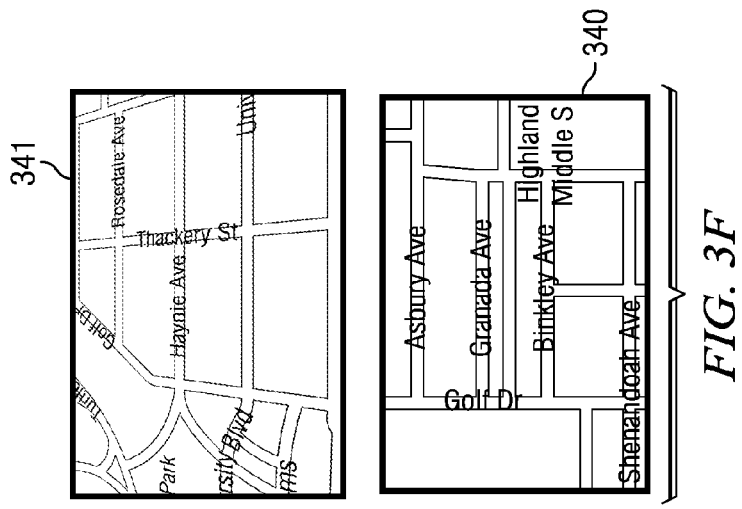
Figure 3E:
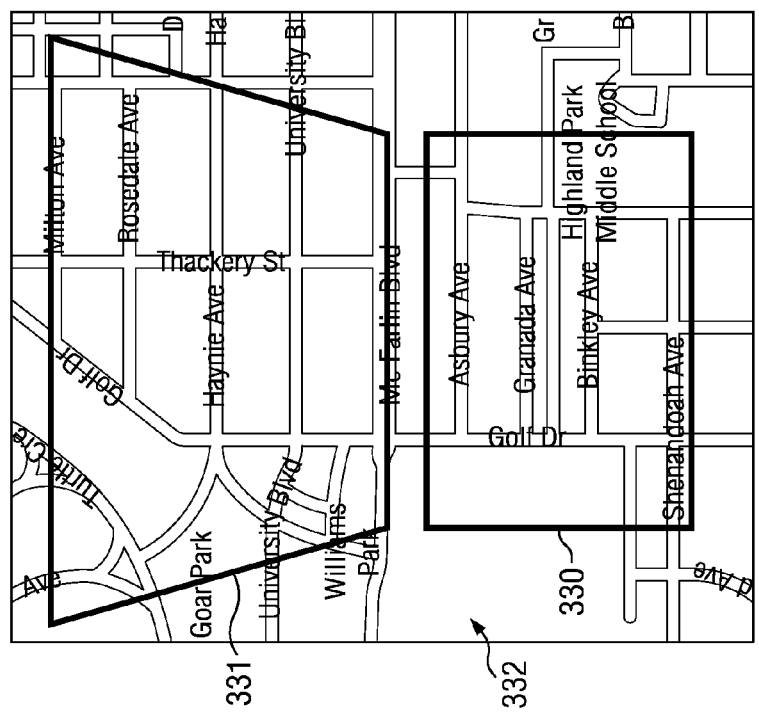
Figure 3D:
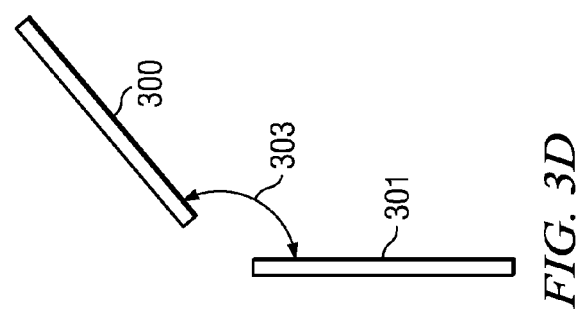

FIG. 3D is a diagram illustrating another example of an angle between displays according to an example embodiment. In the example of FIG. 3D, angle 303 relates to the angle between display 300 and display 301. Depending upon the level of precision with which an apparatus determines the angle, the apparatus may determine angle 303 to be substantially 45 degrees.

FIG. 3E is a diagram illustrating an example of information for display according to an example embodiment. In the example of FIG. 3E, boundary 330 and boundary 331 relate to regions of a common virtual screen 332 comprising map information. The position of boundary 330 may be determined similar as described with reference to FIG. 3B. The position of boundary 331 may be based, at least in part, on position of boundary 330. In an example embodiment, position of boundary 351 may be based, at least in part on relative position of display 300 and display 301. For example, boundary 331 may be positioned so that the lower part of boundary 331 offset a distance directly above the upper part of boundary 330. The offset may be proportional to the distance between display 300 and display 301. Without limiting the scope of the claims in any way, a technical advantage of the lower part of boundary 331 offset a distance directly above the upper part of boundary 330 may be to improve user perceived coherence of information by representing information across multiple displays having similar distances to the information of the virtual screen. Boundary 331 relates to an angled representation of virtual screen 332 based, at least in part, on a represented angle that is proportional to angle 303 of FIG. 3D, similar as described with reference to FIGS. 2H-2J.

FIG. 3F is a diagram illustrating an example of a first information 340 and a second information 341, in relation respectively to boundaries 330 and 331 of FIG. 3E, associated with a representation of a part of the virtual screen 332 of FIG. 3E according to an example embodiment. First information 340 may be caused to be displayed on display 301 of FIG. 3D. Second information 341, which relates to an angled representation of part of virtual screen 332 of FIG. 3E, may be caused to be displayed on display 300 of FIG. 3D. It can be seen that the boundary of the information 340 corresponds to boundary 330 of FIG. 3E and that boundary of the information 341 corresponds to boundary 331 of FIG. 3E. Even though not shown in the example of FIG. 3F, first information 340 and/or second information 341 may comprise additional information related to operating information, program information, time information, signal strength information, augmented reality information, and/or the like.

Figure 3I:
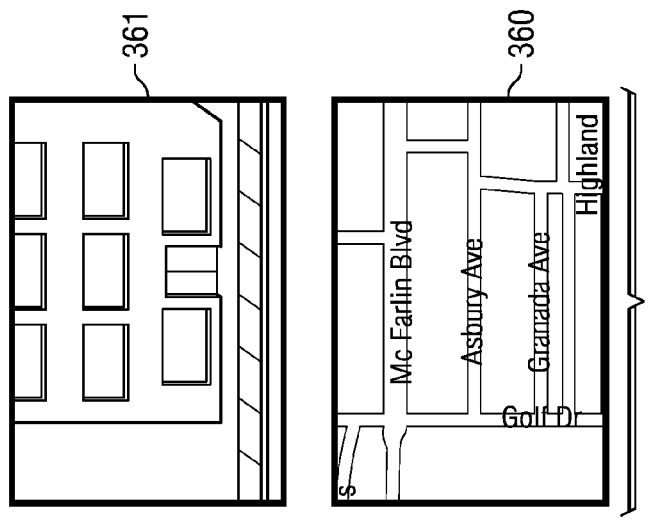
Figure 3H:
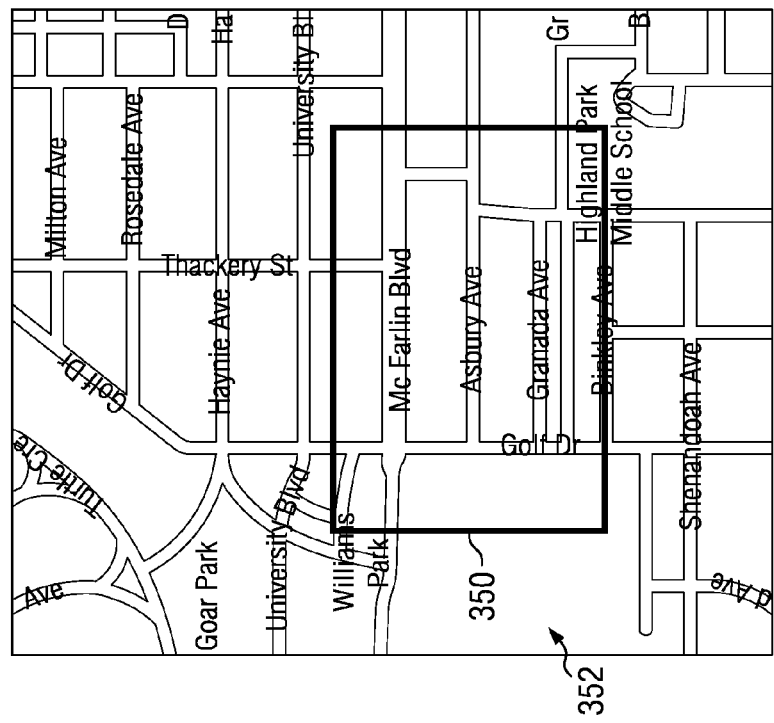
Figure 3G:
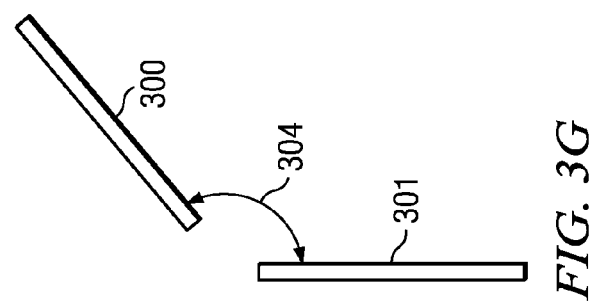

FIG. 3G is a diagram illustrating another example of an angle between displays according to an example embodiment. In the example of FIG. 3G, angle 304 relates to the angle between display 300 and display 301. Depending upon the level of precision an apparatus determines the angle, the apparatus may determine angle 304 to be substantially 45 degrees.

FIG. 3H is a diagram illustrating an example of information for display according to an example embodiment. In the example of FIG. 3H, boundary 350 relates to a region of a virtual screen 352 comprising map information. The position of boundary 350 may be determined similar as described with reference to FIG. 3B.

FIG. 3I is a diagram illustrating an example of a first information 360 in relation to boundary 350 of FIG. 3H associated with a representation of a part of the virtual screen 352 of FIG. 3H, and second information 361 according to an example embodiment. First information 360 may be caused to be displayed on display 301 of FIG. 3G. Second information 341 relates to a perspective view associated with a location associated with first information 360 in relation to a represented angle based, at least in part, on angle 304 of FIG. 3G. Second information 341 may be caused to be displayed on display 300 of FIG. 3D. The perspective view of first information 361 may be similar as described with reference to FIGS. 2C-2D in relation to a represented angle proportional to angle 304 of FIG. 3G. The perspective view may be associated with a location associated with first information 360. For example, the location may relate to a predetermined part of first information 360. In such an example, the location may relate to the center of first information 360, the top of first information 360, and/or the like. In another example, the location may relate to a movable position associated with the first information. In such an example, the location may relate to a position that may be determined in response to a computer program, input, and/or the like. The location may be indicated in first information 360. For example, the location may be indicated by a mark, a logo, and icon, and/or the like. Even though not shown in the example of FIG. 3I, first information 360 and/or second information 361 may comprise additional information related to operating information, program information, time information, signal strength information, augmented reality information, and/or the like.

Figure 3L:
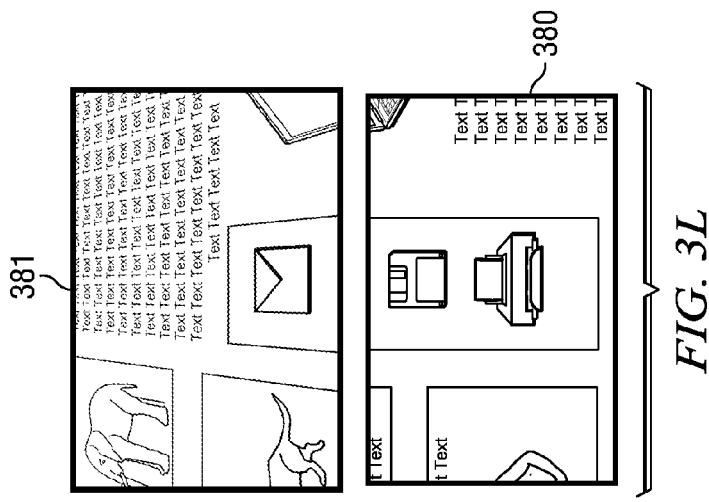
Figure 3K:
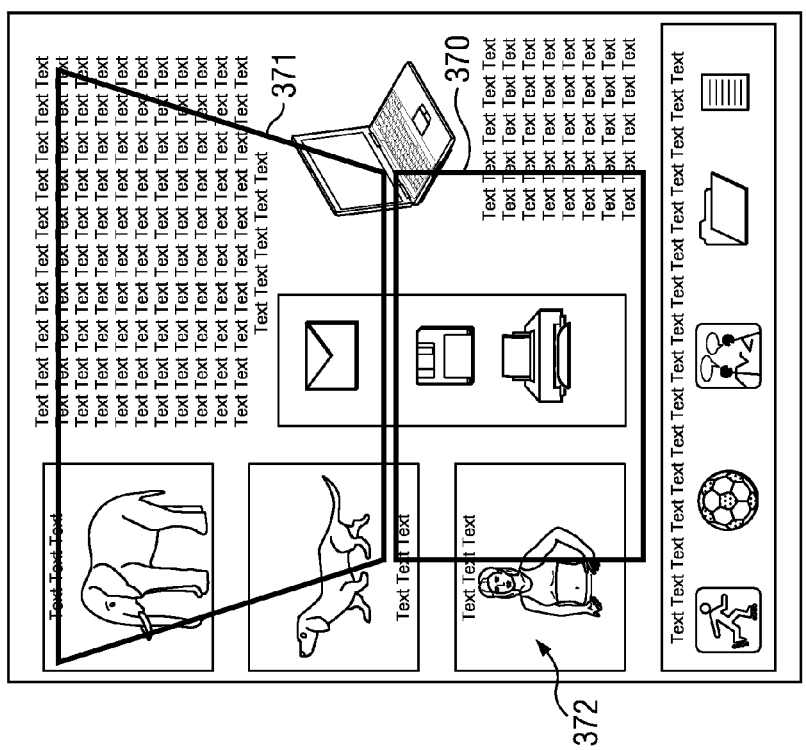
Figure 3J:
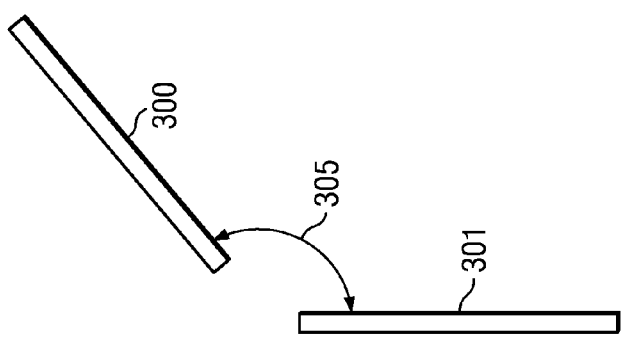

FIG. 3J is a diagram illustrating another example of an angle between displays according to an example embodiment. In the example of FIG. 3J, angle 305 relates to the angle between display 300 and display 301. Depending upon the level of precision with which an apparatus determines the angle, the apparatus may determine angle 305 to be substantially 45 degrees.

FIG. 3K is a diagram illustrating an example of information for display according to an example embodiment. In the example of FIG. 3K, boundary 370 and boundary 371 relate to regions of a common virtual screen 372 comprising information. The positions of boundary 370 and boundary 371 may be determined similar as described with reference to FIG. 3E. Boundary 371 relates to an angled representation of virtual screen 372 based, at least in part, on a represented angle that is proportional to angle 305 of FIG. 3J, similar as described with reference to FIGS. 2H-2J.

FIG. 3L is a diagram illustrating an example of a first information 380 and a second information 381, in relation respectively to boundaries 370 and 371 of FIG. 3K, associated with a representation of a part of the virtual screen 372 of FIG. 3K according to an example embodiment. First information 380 may be caused to be displayed on display 301 of FIG. 3J. Second information 381, which relates to an angled representation of part of virtual screen 372 of FIG. 3K, may be caused to be displayed on display 300 of FIG. 3J. It can be seen that the boundary of the information 380 corresponds to boundary 370 of FIG. 3K and that boundary of the information 381 corresponds to boundary 371 of FIG. 3K. Even though not shown in the example of FIG. 3L, first information 380 and/or second information 381 may comprise additional information related to operating information, program information, time information, signal strength information, augmented reality information, and/or the like.

Figure 4:
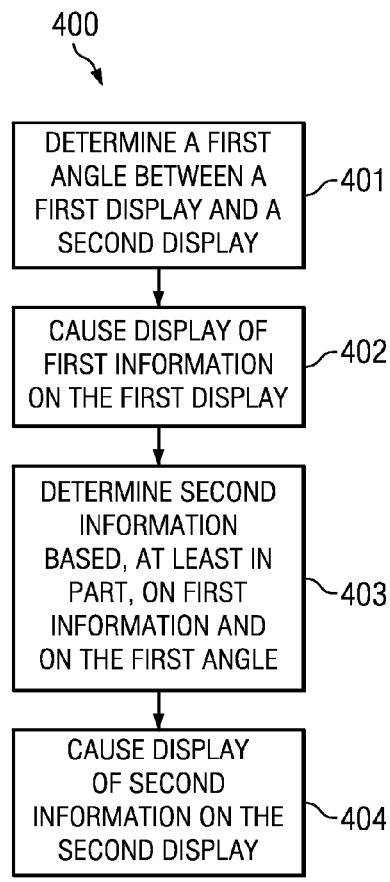
FIG. 4 is a flow diagram showing a set of operations for determining information for display.

FIG. 4 is a flow diagram showing a set of operations 400 for determining information for display. An apparatus, for example electronic device 10 of FIG. 7 or a portion thereof, may utilize the set of operations 400. The apparatus may comprise means, including, for example processor 20 of FIG. 7, for performing the operations of FIG. 4. In an example embodiment, an apparatus, for example device 10 of FIG. 7 is transformed by having memory, for example memory 42 of FIG. 7, comprising computer code configured to, working with a processor, for example processor 20 of FIG. 7, cause the apparatus to perform set of operations 400.

At block 401, the apparatus determines a first angle between a first display and a second display. The determination of the first angle may be similar as described with reference to FIGS. 1A-1D.

At block 402, the apparatus causes display of a first information on the first display, such as display 28 of FIG. 7. The apparatus may cause display of the first information by sending information to an external display, an internal display, a display comprised by the apparatus, and/or the like. The first information may be similar as described with reference to FIGS. 2B, 2D, 2G, 2J, first information 320 of FIG. 3C, first information 340 of FIG. 3F, first information 360 of FIG. 3I, first information 380 of FIG. 3L, and/or the like. The first display may be similar as described with reference to display 301 of FIGS. 3A, 3D, 3G, and 3J, and/or the like.

At block 403, the apparatus determines a second information based, at least in part, on first information and on the first angle. Determination of the second information may be similar as described with reference to FIGS. 3A-3L.

At block 404, the apparatus causes display of the second information on the second display. Causing display of the second information may be similar as described with respect to block 402. The second information may be similar as described with reference to FIGS. 2B, 2D, 2G, 2J, second information 321 of FIG. 3C, second information 341 of FIG. 3F, second information 361 of FIG. 3I, second information 381 of FIG. 3L, and/or the like. The second display may be similar as described with reference to display 300 of FIGS. 3A, 3D, 3G, and 3J, and/or the like.

In an example embodiment, an apparatus may determine whether to cause a perspective view or an angled view to be displayed in the second display based, at least in part, on the angle between the firs display and the second display. For example, a user may be viewing first display and a second display that have an angle between them of substantially 180 degrees. In such an example, the user may view map information in the first display, and map information associated with a region above the map information of the first display in the second display. However, upon the user changing the angle between the first display and the second display to be substantially less than 180 degrees, the user may view, in the second display, a perspective view associated with the changed angle and a location associated with the map information of the first display.

In another example embodiment, an apparatus may change information caused to be displayed in the second display based, at least in part, on a change associated with information caused to be displayed in the first display. For example, a user may be viewing map information in the first display, and map information in the second display associated with a location indicated in the information caused to be displayed in the first display. However, upon the user changing the location, the user may view a change in the map information caused to be displayed in the second display. In another example, a user may be viewing map information in the first display, and a perspective view in the second display associated with a location indicated in the information caused to be displayed in the first display. However, upon the user changing the location, the user may view a change in the perspective view caused to be displayed in the second display, such as a different building, street, landscape, and/or the like.

Figure 5:
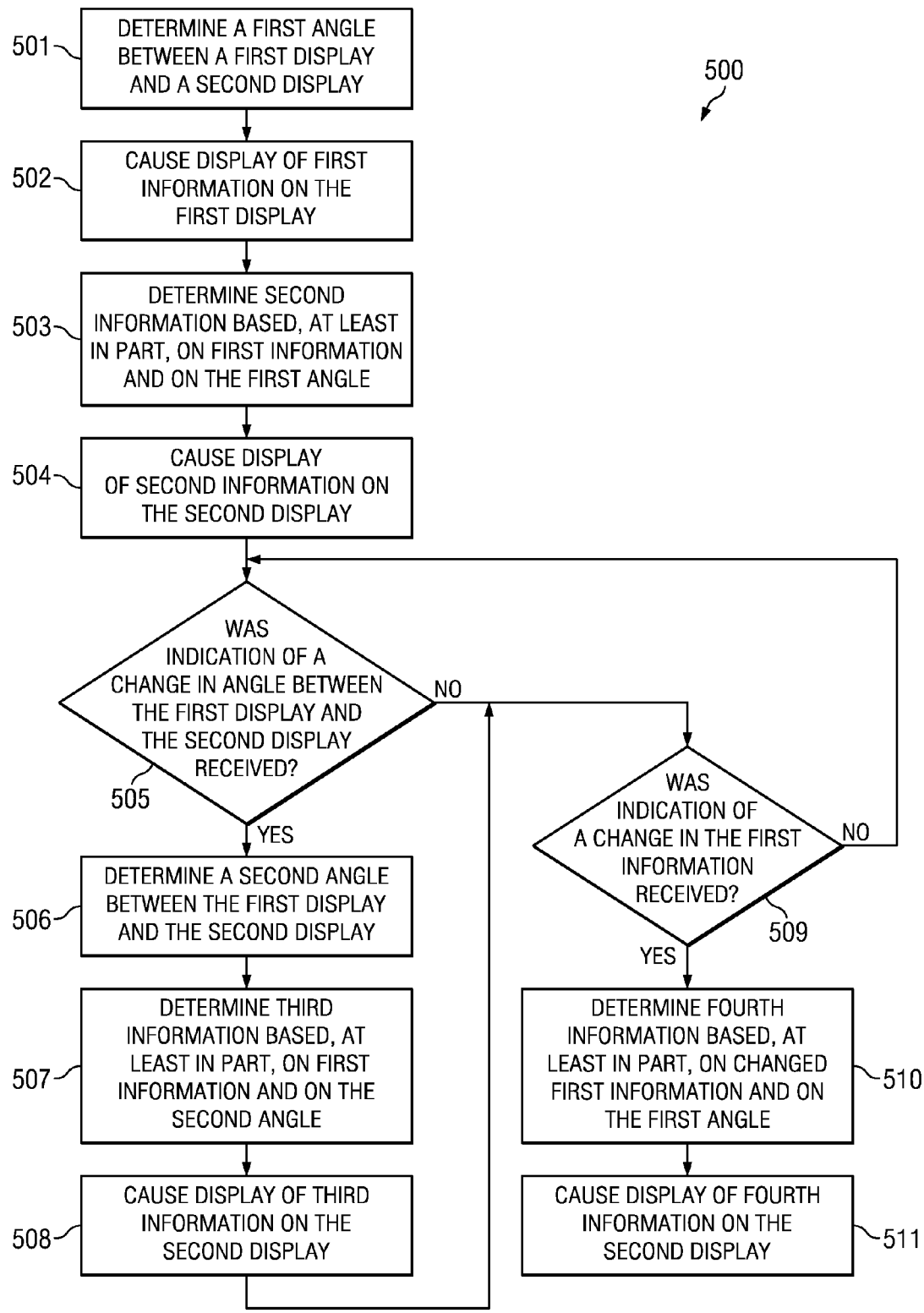
FIG. 5 is a flow diagram showing another set of operations for determining information for display.

FIG. 5 is a flow diagram showing a set of operations 500 for determining information for display. An apparatus, for example electronic device 10 of FIG. 7 or a portion thereof, may utilize the set of operations 500. The apparatus may comprise means, including, for example processor 20 of FIG. 7, for performing the operations of FIG. 5. In an example embodiment, an apparatus, for example device 10 of FIG. 7 is transformed by having memory, for example memory 42 of FIG. 7, comprising computer code configured to, working with a processor, for example processor 20 of FIG. 7, cause the apparatus to perform set of operations 500.

At block 501, the apparatus determines a first angle between a first display and a second display. The determination of the first angle may be similar as described with reference to block 401 of FIG. 4.

At block 502, the apparatus causes display of a first information on the first display. The display of the first information on the first display may be similar as described with reference to block 402 of FIG. 4.

At block 503, the apparatus determines a second information based, at least in part, on first information and on the first angle. Determination of the second information may be similar as described with reference to block 403 of FIG. 4.

At block 504, the apparatus causes display of the second information on the second display. Causing display of the second information may be similar as described with respect to block 404 of FIG. 4.

At block 505, the apparatus receives an indication of a change in angle between the first display and second display. The indication may be received from the apparatus and/or from a separate apparatus. For example, the apparatus may receive indication of a change in angle from a sensor, such as sensor 37 of FIG. 7, comprised by the apparatus. The indication of the change in angle may indicate that the angle has changed, a value of the changed angle, and/or the like.

At block 506, the apparatus determines a second angle between the first display and the second display that is simultaneously viewable with the first display. The determination of the second angle may be similar as described with reference to block 401 of FIG. 4.

At block 507, the apparatus determines a third information based at least in part on the first information and the second angle. The determination of the third information may be similar as described with reference to block 403 of FIG. 4.

At block 508, the apparatus causes display of the third information on the second display. The causing of display of the third information on the second display may be similar as described with reference to block 404 of FIG. 4.

At block 509, the apparatus receives indication of a change in the first information. The indication may be received from the apparatus and/or from a separate apparatus. The change in the first information may relate to a change from input, such as panning, zooming, moving a position associated with the first information, changing content, and/or the like.

At block 510, the apparatus determines a fourth information based at least in part on the change in the first information and the first angle. The determination of the fourth information may be similar as described with reference to block 403 of FIG. 4.

At block 511, the apparatus causes display of the fourth information on the second display. The causing of display of the third information on the second display may be similar as described with reference to block 404 of FIG. 4.

FIGS. 6A-6D are diagrams illustrating a virtual screen according to an example embodiment. The examples of FIGS. 6A-6D are merely examples of possible virtual screens and regions caused to be displayed, and do not limit the scope of the claims. For example, a virtual screen and/or a region caused to be displayed may vary by size, shape, orientation, and/or the like.

Figure 6A:
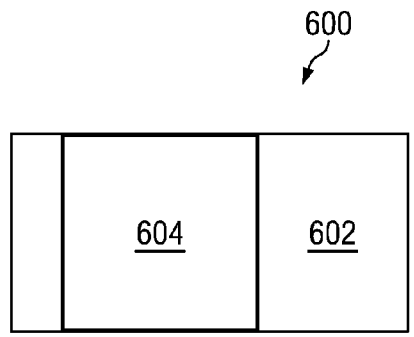
FIGS. 6A-6D are diagrams illustrating a virtual screen according to an example embodiment.

FIG. 6A is a diagram illustrating a virtual screen wider than the part of the virtual screen caused to be displayed, for example on display 28 of FIG. 7. In the example of FIG. 6A, region 604 relates to a part of virtual screen 602 that is caused to be displayed. The virtual screen 602 may represent an image, text, a group of items, a list, a work area, map information, and/or the like. For example, if an image is wider than what is determined to be caused to display, virtual screen 602 may be used for the image. In such an example, region 604 may be panned left or right to change the part of the virtual screen 602 that is caused to be displayed. In an example embodiment, changing the part of the virtual screen 602 that is caused to be displayed may be performed when input is received. In an example embodiment, region 604 may be prevented from panning beyond one or more boundary of virtual screen 602.

Figure 6B:
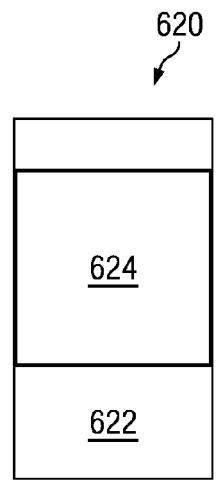

FIG. 6B is a diagram illustrating a virtual screen taller than the part of the virtual screen caused to be displayed, for example on display 28 of FIG. 7. In the example of FIG. 6B, region 624 relates to a part of virtual screen 622 that is caused to be displayed. The virtual screen 622 may represent an image, text, a group of items, a list, a work area, map information, and/or the like. For example, if group of items, such as a group of icons, is taller than what is determined to be caused to display, virtual screen 622 may be used for the group of icons. In such an example, region 624 may be panned up or down to change the part of the virtual screen 622 that is caused to be displayed. In an example embodiment, changing the part of the virtual screen 622 that is caused to be displayed may be performed when input is received. In an example embodiment, region 624 may be prevented from panning beyond one or more boundary of virtual screen 622.

Figure 6C:
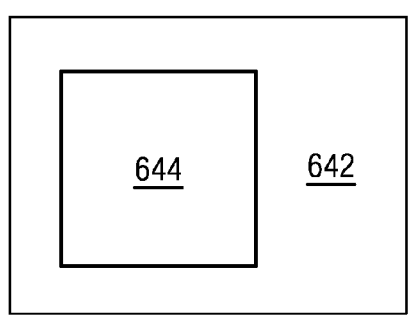

FIG. 6C is a diagram illustrating a virtual screen wider and taller than the part of the virtual screen caused to be displayed, for example on display 28 of FIG. 7. In the example of FIG. 6C, region 644 relates to a part of virtual screen 642 that is caused to be displayed. The virtual screen 642 may represent an image, text, a group of items, a list, a work area, map information, and/or the like. For example, if map information is wider and taller than what is determined to be caused to display, virtual screen 642 may be used for the map information. In such an example, region 644 may be panned left, right, up, and/or down to change the part of the virtual screen 642 that is caused to be displayed. In an example embodiment, changing the part of the virtual screen 642 that is caused to be displayed may be performed when input is received. In an example embodiment, region 644 may be prevented from panning beyond one or more boundary of virtual screen 642.

Figure 6D:
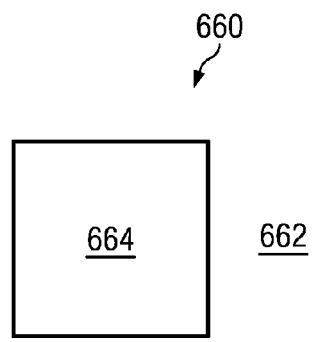

FIG. 6D is a diagram illustrating a virtual screen is the same size as the part of the virtual screen caused to be displayed. In the example of FIG. 6D, region 664 relates to a part of virtual screen 662 that is caused to be displayed. The virtual screen 662 may represent an image, text, a group of items, a list, a work area, map information, and/or the like. For example, if it is determined to be caused to display an entire work area, virtual screen 662 may be used for the work area.

FIG. 7 is a block diagram showing an apparatus, such as an electronic device 10, according to an example embodiment. It should be understood, however, that an electronic device as illustrated and hereinafter described is merely illustrative of an electronic device that could benefit from embodiments of the invention and, therefore, should not be taken to limit the scope of the invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, media players, cameras, video recorders, global positioning system (GPS) devices and other types of electronic systems, may readily employ embodiments of the invention. Moreover, the apparatus of an example embodiment need not be the entire electronic device, but may be a component or group of components of the electronic device in other example embodiments.

Furthermore, devices may readily employ embodiments of the invention regardless of their intent to provide mobility. In this regard, even though embodiments of the invention are described in conjunction with mobile communications applications, it should be understood that embodiments of the invention may be utilized in conjunction with a variety of other applications, both in the mobile communications industries and outside of the mobile communications industries.

The electronic device 10 may comprise an antenna, (or multiple antennae), a wired connector, and/or the like in operable communication with a transmitter 14 and a receiver 16. The electronic device 10 may further comprise a processor 20 or other processing circuitry that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with wireline protocols, such as Ethernet, digital subscriber line (DSL), asynchronous transfer mode (ATM), second-generation (2G) wireless communication protocols IS-136 (time division multiple access (TDMA)), Global System for Mobile communications (GSM)), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), or with fourth-generation (4G) wireless communication protocols, wireless networking protocols, such as 802.11, short-range wireless protocols, such as Bluetooth, and/or the like.

As used in this application, the term 'circuitry' refers to all of the following: hardware-only implementations (such as implementations in only analog and/or digital circuitry) and to combinations of circuits and software and/or firmware such as to a combination of processor(s) or portions of processor(s)/software including digital signal processor(s), software, and memory(ies) that work together to cause an apparatus, such as a mobile phone or server, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor, multiple processors, or portion of a processor and its (or their) accompanying software and/or firmware. The term "circuitry" would also cover, for example, a baseband integrated circuit or applications processor integrated circuit for a mobile phone or a similar integrated circuit in a cellular network device or other network device.

Processor 20 may comprise means, such as circuitry, for implementing audio, video, communication, navigation, logic functions, and/or the like, as well as for implementing embodiments of the invention including, for example, one or more of the functions described in conjunction with FIGS. 1-6. For example, processor 20 may comprise means, such as a digital signal processor device, a microprocessor device, various analog to digital converters, digital to analog converters, processing circuitry and other support circuits, for performing various functions including, for example, one or more of the functions described in conjunction with FIGS. 1-6. The apparatus may perform control and signal processing functions of the electronic device 10 among these devices according to their respective capabilities. The processor 20 thus may comprise the functionality to encode and interleave message and data prior to modulation and transmission. The processor 20 may additionally comprise an internal voice coder, and may comprise an internal data modem. Further, the processor 20 may comprise functionality to operate one or more software programs, which may be stored in memory and which may, among other things, cause the processor 20 to implement at least one embodiment including, for example, one or more of the functions described in conjunction with FIGS. 1-6. For example, the processor 20 may operate a connectivity program, such as a conventional internet browser. The connectivity program may allow the electronic device 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic device 10 may comprise a user interface for providing output and/or receiving input. The electronic device 10 may comprise an output device such as a ringer, a conventional earphone and/or speaker 24, a microphone 26, a display 28, and/or a user input interface, which are coupled to the processor 20. The user input interface, which allows the electronic device 10 to receive data, may comprise means, such as one or more devices that may allow the electronic device 10 to receive data, such as a keypad 30, a touch display, for example if display 28 comprises touch capability, and/or the like. In an embodiment comprising a touch display, the touch display may be configured to receive input from a single point of contact, multiple points of contact, and/or the like. In such an embodiment, the touch display and/or the processor may determine input based on position, motion, speed, contact area, and/or the like.

The electronic device 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. Display 28 may be display two-dimensional information, three-dimensional information and/or the like.

In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the processor 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 may comprise hardware, such as a lens or other optical component(s), and/or software necessary for creating a digital image file from a captured image. Alternatively, the camera module 36 may comprise only the hardware for viewing an image, while a memory device of the electronic device 10 stores instructions for execution by the processor 20 in the form of software for creating a digital image file from a captured image. In an example embodiment, the camera module 36 may further comprise a processing element such as a co-processor that assists the processor 20 in processing image data and an encoder and/or decoder for compressing and/or decompressing image data. The encoder and/or decoder may encode and/or decode according to a standard format, for example, a Joint Photographic Experts Group (JPEG) standard format.

The electronic device 10 may comprise one or more user identity modules (UIM) 38. The UIM may comprise information stored in memory of electronic device 10, a part of electronic device 10, a device coupled with electronic device 10, and/or the like. The UIM 38 may comprise a memory device having a built-in processor. The UIM 38 may comprise, for example, a subscriber identity module (SIM), a universal integrated circuit card (UICC), a universal subscriber identity module (USIM), a removable user identity module (R-UIM), and/or the like. The UIM 38 may store information elements related to a subscriber, an operator, a user account, and/or the like. For example, UIM 38 may store subscriber information, message information, contact information, security information, program information, and/or the like. Usage of one or more UIM 38 may be enabled and/or disabled. For example, electronic device 10 may enable usage of a first UIM and disable usage of a second UIM.

In an example embodiment, electronic device 10 comprises a single UIM 38. In such an embodiment, at least part of subscriber information may be stored on the UIM 38.

In another example embodiment, electronic device 10 comprises a plurality of UIM 38. For example, electronic device 10 may comprise two UIM 38 blocks. In such an example, electronic device 10 may utilize part of subscriber information of a first UIM 38 under some circumstances and part of subscriber information of a second UIM 38 under other circumstances. For example, electronic device 10 may enable usage of the first UIM 38 and disable usage of the second UIM 38. In another example, electronic device 10 may disable usage of the first UIM 38 and enable usage of the second UIM 38. In still another example, electronic device 10 may utilize subscriber information from the first UIM 38 and the second UIM 38.

Electronic device 10 may comprise a memory device including, in one embodiment, volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may comprise an EEPROM, flash memory or the like. The memories may store any of a number of pieces of information, and data. The information and data may be used by the electronic device 10 to implement one or more functions of the electronic device 10, such as the functions described in conjunction with FIGS. 1-7. For example, the memories may comprise an identifier, such as an international mobile equipment identification (IMEI) code, which may uniquely identify the electronic device 10.

Electronic device 10 may comprise one or more sensor 37. Sensor 37 may comprise a light sensor, a proximity sensor, a motion sensor, a location sensor, and/or the like. For example, sensor 37 may comprise one or more light sensors at various locations on the device. In such an example, sensor 37 may provide sensor information indicating an amount of light perceived by one or more light sensors. Such light sensors may comprise a photovoltaic element, a photoresistive element, a charge coupled device (CCD), and/or the like. In another example, sensor 37 may comprise one or more proximity sensors at various locations on the device. In such an example, sensor 37 may provide sensor information indicating proximity of an object, a user, a part of a user, and/or the like, to the one or more proximity sensors. Such proximity sensors may comprise capacitive measurement, sonar measurement, radar measurement, and/or the like. In another example, the sensor may provide information related to an position and/or orientation of at least part of the apparatus. In such an example, the sensor may provide information relating to an angle between two movably attached parts of the apparatus.

Although FIG. 7 illustrates an example of an electronic device that may utilize embodiments of the invention including those described and depicted, for example, in FIGS. 1-6, electronic device 10 of FIG. 7 is merely an example of a device that may utilize embodiments of the invention.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media. In the context of this document, a "computer-readable medium" may be any tangible media or means that can contain, or store the instructions for use by or in connection with an instruction execution system, apparatus, or device, such as a computer, with one example of a computer described and depicted in FIG. 7. A computer-readable medium may comprise a computer-readable storage medium that may be any tangible media or means that can contain or store the instructions for use by or in connection with an instruction execution system, apparatus, or device, such as a computer.

If desired, the different functions discussed herein may be performed in a different order and/or concurrently with each other. For example, block 505 of FIG. 5 may be performed after block 509. In another example, block 510 of FIG. 5 may be performed prior to block 506 of FIG. 5. Furthermore, if desired, one or more of the above-described functions may be optional or may be combined. For example, block 509 of FIG. 5 may be optional or combined with block 505 of FIG. 5.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
    a processor;
    memory including computer program code, the memory and the computer program code configured to, working with the processor, cause the apparatus to perform at least the following:
    determine a first angle between a first display and a second display that is simultaneously viewable with the first display;
    cause display of a first information on the first display;
    determine a second information based, at least in part, on first information and on the first angle;
    cause display of the second information on the second display;
    receive an indication of a change in angle between the first display and the second display;
    determine a second angle between the first display and the second display that is simultaneously viewable with the first display;
    determine a third information based at least in part on the first information and the second angle; and
    cause display of the first information on the first display and the third information on the second display.

2. The apparatus of claim 1, wherein the second information comprises a representation of information related to a represented angle that is proportional to the first angle.

3. The apparatus of claim 1, wherein determining the second information is based, at least in part, on relative position of the first display and the second display.

4. The apparatus of claim 3, wherein the relative position relates to distance between the first display and the second display.

5. The apparatus of claim 1, wherein determining the second information is based, at least in part, on position of first information in relation to a virtual screen.

6. The apparatus of claim 1, wherein the first angle is substantially 180 degrees, and the first information and the second information indicate map information.

7. The apparatus of claim 1, wherein
    the first angle is substantially 180 degrees;
    the first information and the second information indicate map information;
    the second angle is substantially less than 180 degrees; and
    the third information relates to a perspective view associated with a location associated with the map information in relation to a represented angle based, at least in part, on the second angle.

8. The apparatus of claim 1, wherein the memory and computer program code are further configured to, working with the processor, cause the apparatus to perform at least the following:
    receive indication of a change in the first information;
    determine a fourth information based at least in part on the change in the first information and the first angle; and
    cause display of the fourth information on the second display.

9. The apparatus of claim 8, wherein
    the first information indicates map information;
    the second information relates to a perspective view associated with a location indicated in the first information in relation to a first represented angle based, at least in part, on the first angle;
    the change in the first information relates to a change in the location indicated in the first information; and
    the fourth information relates to a perspective view associated with the change in location in relation to a second represented angle based, at least in part on the first angle.

10. The apparatus of claim 1, wherein the first information and the second information relate to information of a common virtual screen.

11. The apparatus of claim 10, wherein the second information relates to an angled representation of a part of the virtual screen, and the first angle is at least a partial basis for angle of the angled representation.

12. The apparatus of claim 11, wherein the virtual screen comprises map information.

13. The apparatus of claim 1, wherein determining the second information comprises determining that the first angle is beyond a threshold value, and basing the second information, at least in part on the threshold value and the first information.

14. The apparatus of claim 1, wherein the first information indicates map information, and the second information relates to a perspective view associated with a location associated with the first information in relation to a represented angle based, at least in part, on the first angle.

15. The apparatus of claim 14, wherein the perspective view is associated with a location indicated in the first information.

16. The apparatus of claim 1, further comprising the first display and the second display.

17. The apparatus of claim 1, further comprising at least one sensor and determining the angle between the first display and the second display comprises receiving information from the sensor.

18. A method, comprising:
    determining a first angle between a first display and a second display that is simultaneously viewable with the first display;

causing display of a first information on the first display;

determining, with a processor, a second information based, at least in part, on first information and on the first angle;

causing display of the second information on the second display;

receiving an indication of a change in angle between the first display and the second display;

determining a second angle between the first display and the second display that is simultaneously viewable with the first display;

determining a third information based at least in part on the first information and the second angle; and causing display of the first information on the first display and the third information on the second display.

19. A non-transitory computer-readable medium encoded with instructions that, when executed by a computer, perform:

determining a first angle between a first display and a second display that is simultaneously viewable with the first display;

causing display of a first information on the first display;

determining a second information based, at least in part, on first information and on the first angle;

causing display of the second information on the second display;

receiving an indication of a change in angle between the first display and the second display;

determining a second angle between the first display and the second display that is simultaneously viewable with the first display;

determining a third information based at least in part on the first information and the second angle; and causing display of the first information on the first display and the third information on the second display.

* * * * *